United States Patent [19]

Huebner

[11] 4,408,924
[45] Oct. 11, 1983

[54] SPLIT COLLAR

[75] Inventor: Richard Huebner, New Berlin, Wis.

[73] Assignee: Harley-Davidson Motor Co., Inc., Milwaukee, Wis.

[21] Appl. No.: 411,547

[22] Filed: Aug. 25, 1982

[51] Int. Cl.³ .............................................. F16B 2/08
[52] U.S. Cl. .................................. 403/23; 403/344; 403/286; 403/341; 277/197; 285/45
[58] Field of Search ............... 403/341, 23, 286, 344, 403/291; 285/45, 318; 277/197; 24/252 A, 255, 257, 20 S, 17 B; 206/805

[56] References Cited

U.S. PATENT DOCUMENTS 3,495,853  2/1970  Furrer ............................ 285/108 X
3,858,719  1/1975  Isaacs ............................ 206/805 X

FOREIGN PATENT DOCUMENTS 73319  5/1940  Czechoslovakia .................. 403/344

*Primary Examiner*—Andrew V. Kundrat
*Assistant Examiner*—Joseph A. Fischetti
*Attorney, Agent, or Firm*—John C. Cooper, III; Fred Wiviott

[57] ABSTRACT

A split collar for surrounding an article comprises two half sections, each having an internal surface configured to engage the article. A pair of grooves surrounds the collar, and a cut-out is provided to form a pair of attachment projections. An elastic member, such as a rubber band or O-ring, is folded in half and one end is placed around one of the projections. The two strands of the folded elastic member are then placed in the grooves and drawn around the two half sections. The other end of the elastic member is then stretched over the other projection, whereby the two half sections are held together. The collar is suited for many uses, such as covering the junction between the telescoping tubes of a motorcycle fork assembly.

12 Claims, 3 Drawing Figures

SPLIT COLLAR

BACKGROUND OF THE INVENTION

1. Field of the Invention

The present invention relates generally to the art of collars for surrounding another article, and in particular to a quick attachment split collar.

2. Description of the Prior Art

In many fields a need exists for surrounding an article with a collar. For example, such a need exists in the motorcycle art. This description of one particular application should not be read as limiting, however, because one skilled in the art could readily adopt the principles of the present invention to a variety of other applications after reading this specification.

In the motorcycle art, it is common for the front wheel to be mounted in a fork assembly which includes a pair of telescoping shock absorbing tubes on either side of the tire. The tubes include a lower tube and an upper tube of relatively smaller diameter received therein. The junction of the two tubes includes seals for preventing the escape of air or fluid as the two tubes move with respect to one another. It is desirable to provide a protective cover (commonly referred to as a boot) around the junction area. The cover fits around the larger tube and usually has a constricted upper end to fit around the upper tube while still allowing movement of the upper tube therethrough.

Such covers are installed during assembly of the fork by slipping the cover down over the end of the upper tube into its correct position. Replacement of the cover requires portions of the fork to be disassembled to allow the old cover to be removed and the new one slipped into place.

Besides performing the function of protecting the junction between these tubes, decorative covers may be employed to improve the overall appearance of the motorcycle. Such decorative covers may replace factory installed covers. Installation thereof also requires disassembly of the fork.

A cover for motorcycle fork tubes which could be replaced or installed without disassembly of the fork would represent a significant advance in this art. Moreover, there are a number of other applications where it is desirable to assemble a collar around another article. For example, it may be impractical to place such a collar around a beam, cable, pole or tube because the item to be surrounded is coupled between structure which would prevent addition of the collar without disassembly.

OBJECTS AND SUMMARY OF THE PRESENT INVENTION

A principal object of the present invention is to provide a split collar which may be quickly attached around another article.

Another object of the present invention is to provide a collar which may be installed and replaced without disassembly of the article.

A further object of the present invention is to provide a cover for the junction of the fork tubes of a motorcyle and which may be installed or replaced without disassembly of the fork.

How these and other objects of the invention are accomplished will be described in the following description of the invention taken in conjunction with the drawings. Generally, however, the objects are accomplished by providing a collar which is split into two halves and which has an opening therethrough. The opening is configured to engage the article with which the collar is to be used. A pair of grooves are provided around the collar, and a ridge is formed therebetween. The collar is notched at one location around the groove so that a pair of projections are formed in the ridge which face one another and are spaced apart. The split collar is secured around the article by using a loop of elastic material, such as a rubber band or O-ring. The loop is placed around one of the projections and wrapped around the collar halves. The loop lies in the grooves and the free end of the loop is stretched over the other projection.

DESCRIPTION OF THE PREFERRED EMBODIMENT

The present invention will be illustrated by reference to its use with motorcycles. As mentioned previously, however, the scope of the invention is not to be so limited.

Figure 1:
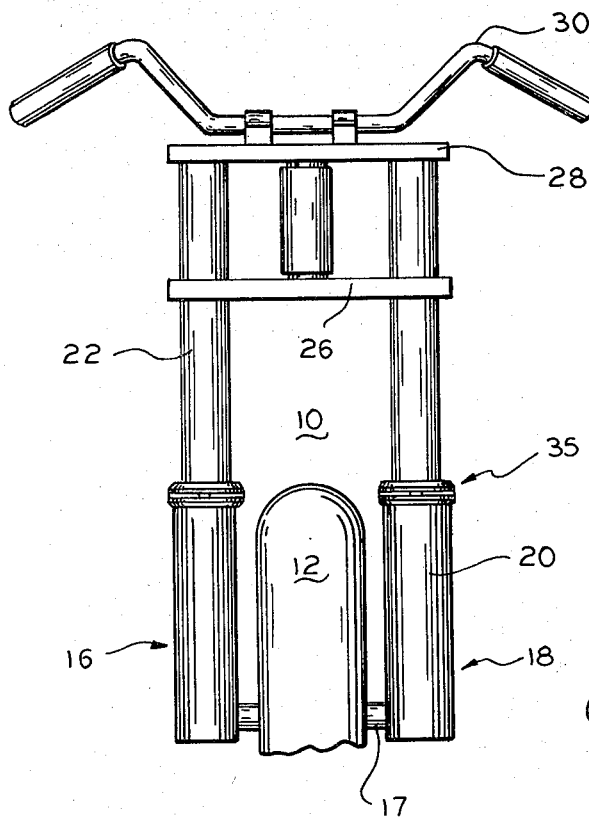
FIG. 1 is a front elevation view, in simplified form, showing the split collar of the present invention used to cover the joint between telescoping tubes of a motorcycle front fork assembly.

FIG. 1 shows in very general form the front fork assembly 10 of a motorcycle to include a tire 12 supported for rotation about an axle 14 and mounted between a pair of telescoping, shock-absorbing fork tube 16 and 18. Forks 16 and 18 each include a lower tube 20 and an upper tube 22 of relatively smaller diameter. A spring (not shown) is provided in tubes 20 and 22 and oil (or other fluid) may also be provided in the tubes as is known in the art. Tubes 22 are coupled to support plates 26 and 28 and a handlebar 30 is attached to the latter. FIG. 1 is shown only in general form as the specific structure of the front fork can vary widely and does not, in and of itself, form part of the present invention. FIG. 1 does, however, illustrate on particular use for the split collar 35 of the present invention. Collars 35 are shown in the drawing to surround the area where tubes 22 enter tubes 20. Collars 35 are shown in greater detail in FIG. 2 and FIG. 3.

Figure 2:
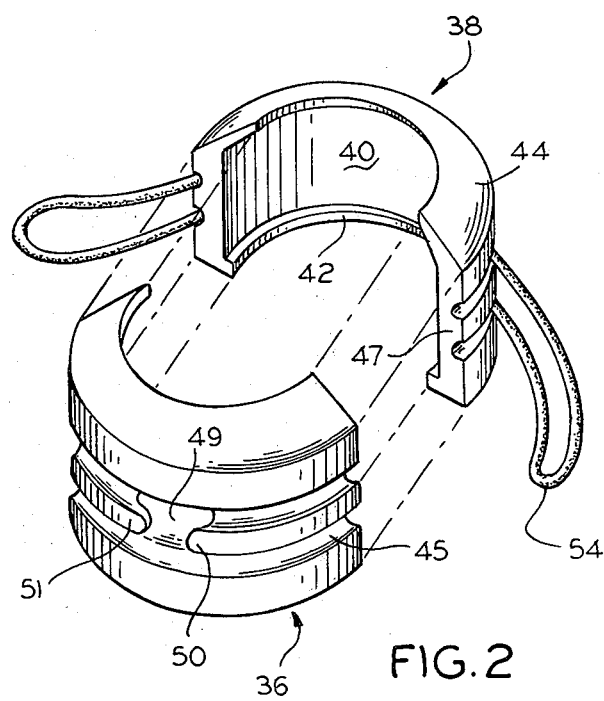
FIG. 2 is an exploded perspective view of the split collar of the present invention with the attachment loop disconnected; and, FIG. 3 is a perspective view of the split collar of the present invention with the attachment loop connected.
Figure 3:
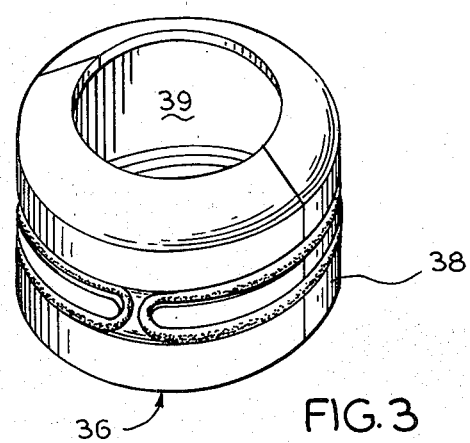

By examining FIGS. 2 and 3, it will be appreciated that collars 35 are composed of two half sections 36 and 38, each being generally C-shaped in horizontal cross-section. When assembled, the collar halves form a generally circular outer surface with an opening 39 extending vertically therethrough. Each of sections 36 and 38 include a vertical wall 40 having a bottom flange 42 extending inwardly therefrom. At the top of wall 40, a frusto-conical top flange 44 extends upwardly and inwardly. It will be appreciated from FIG. 2 that top flange 44 extends further inwardly than does bottom flange 42. The reason is apparent from FIG. 1 in that bottom flange 42 is sized to contact tubes 20 while the inner edge of top flange 42 is adapted to closely surround, but not seat against, the upper tube 22. It should also be appreciated that for other applications, the top and bottom flanges may be parallel, may both include frusto-conical but diverging flanges or may be eliminated entirely. The choice will depend on the configuration of the article to be surrounded and whether movement is to be permitted between the article and collar 35.

A pair of parallel grooves 45 are formed around the half sections 36 and 38 in the exterior surface of wall 40. The grooves are separated by a section of wall 40 which is designated by the numeral 47 in the drawings and which will be referred to as the dividing ridge 47 in the remainder of this specification and the claims. Ridge 47 extends around both half sections 36 and 38 except at one location at the middle of half section 36 where it is interrupted by an indentation 49 which extends down into wall 40 and slightly back underneath the ridge 47 to form a pair of generally pointed projections 50 and 51. Projections 50 and 51 are spaced apart from one another.

The final component of the split collar of the present invention is an elastic loop 54 which may be a rubber O-ring, a rubber band or any other type of elastic loop. It should seat within grooves 45 and have a folded length which, in its relaxed state, is less than the circumference of collar 35.

To assemble collar 35, the half sections are separated and placed around tubes 20 and 22 as previously indicated. They are held in place by hand while loop 54 is placed around projection 50. The loop is then passed around half 38 in groove 45 and is stretched so that its free end can be placed around projection 51. Once this last step is accomplished, the halves will be held in place by the elastic forces of loop 54. Replacement of collar 35 is also easily accomplished by removing the loop.

Collar 35 may include decorative features and may be made from any number of suitable materials, such as plastics, metal (such as chrome or stainless steel), etc. They may also be prepared in variety of sizes and shapes. So while the present invention has been described by reference to a single preferred embodiment, the invention is not to be so limited, but is to be limited solely by the claims which follow.

I claim:
1. A collar for surrounding an article comprising:
first and second collar sections having abutting edges, internal surfaces and external surfaces, the internal surfaces of said collar sections being adapted to surround said article when said abutting edges are adjacent one another and said internal surfaces defining an opening through said collar to accommodate said article;
groove means formed in said external surfaces of said collar sections and lying in a plane which is perpendicular to said opening, said groove means comprising a pair of parallel and spaced apart grooves extending about said external surfaces,
coupling means on one of said first or second collar sections;
elastic means coupled to said coupling means and surrounding said first and second collar sections in said groove means and holding said collar sections together about said article.

2. The invention set forth in claim 1 wherein said coupling means comprise first and second coupling means lying adjacent to but spaced apart from one another and intermediate said grooves.

3. The invention set forth in claim 2 wherein said elastic means comprises a loop of elastic material having ends coupled respectively about said first and second coupling means and an intermediate portion lying in said grooves.

4. The invention set forth in claim 3 wherein said elastic loop comprises a rubber loop.

5. A split collar for surrounding a tubular article comprising:
first and second collar sections each being generally C-shaped, each of said collar sections including an inner surface and an outer surface and said collar sections forming a generally cylindrical opening therethrough when said sections are adjacent one another,
groove means formed in said outer surface of said sections and lying in a plane which is generally perpendicular to the axis of said cylindrical opening said groove means comprising a pair of parallel and spaced apart grooves extending about said outer surface,
coupling means on one of said collar sections,
elastic means coupled to said coupling means and surrounding said first and second collar sections in said groove means and holding said collar sections together about said article.

6. The invention set forth in claim 5 wherein said coupling means comprise first and second coupling means lying adjacent to but spaced apart from one another and intermediate said grooves.

7. The invention set forth in claim 6 wherein said first and second coupling means comprise portions of said outer surface intermediate said grooves and wherein said one collar section is indented intermediate said grooves and said indentation extends under said outer surface.

8. The invention set forth in claim 6 wherein said elastic means comprises a loop of elastic material having ends coupled respectively about said first and second coupling means and an intermediate portion lying in said grooves.

9. The invention set forth in claim 8 wherein said elastic loop comprises a rubber loop.

10. The invention set forth in claim 5 wherein the diameter of said opening varies along the length of said collar.

11. A collar for covering the junction of two co-axial tubes, one of which is slidably received in the other, said collar comprising:
first and second collar halves, said collar halves each having first and second ends and a generally C-shaped wall extending therebetween, projections extending inwardly from said first and second ends, said projection extending from said first end forming a first annular surface adapted to surround one of said tubes and the projection extending from said second end forming second annular surface adapted to surround the other of said tubes;
a pair of spaced-apart grooves formed in the outer surface of said wall, each of said grooves lying in a plane which is perpendicular to the axis of said annular surfaces, a dividing ridge being formed intermediate said grooves,
a cut-out portion in said ring in one of said collar halves said cut-out portion extending into said wall and back under said ridge to form a pair of facing projections intermediate said grooves; and
elastic loop means coupled to said projections and stretched about said first and second collar halves to hold said collar halves together.

12. The invention set forth in claim 11 wherein the diameter of said first annular surface is less than the diameter of said second annular surface.

* * * * *